US008321350B2

(12) United States Patent
Durst, Jr.

(10) Patent No.: US 8,321,350 B2
(45) Date of Patent: Nov. 27, 2012

(54) UNIQUELY LINKING SECURITY ELEMENTS IN IDENTIFICATION DOCUMENTS

(75) Inventor: Robert T. Durst, Jr., Dunstable, MA (US)

(73) Assignee: Digimarc Corporation, Beaverton, OR (US)

( * ) Notice: Subject to any disclaimer, the term of this patent is extended or adjusted under 35 U.S.C. 154(b) by 440 days.

(21) Appl. No.: 12/473,488

(22) Filed: May 28, 2009

(65) Prior Publication Data

US 2010/0135524 A1  Jun. 3, 2010

Related U.S. Application Data

(62) Division of application No. 10/893,149, filed on Jul. 16, 2004, now abandoned.

(60) Provisional application No. 60/488,536, filed on Jul. 17, 2003.

(51) Int. Cl.
*G06K 9/00* (2006.01)
*H04L 9/00* (2006.01)

(52) U.S. Cl. ......... 705/51; 713/176; 283/113; 358/3.28; 162/110

(58) Field of Classification Search .............. 705/51; 713/176; 283/113; 358/3.28; 162/110
See application file for complete search history.

(56) References Cited

U.S. PATENT DOCUMENTS

| | | | |
|---|---|---|---|
| 3,805,238 | A | 4/1974 | Rothfjell |
| 5,396,559 | A | 3/1995 | McGrew |
| 5,841,886 | A | 11/1998 | Rhoads |
| 6,081,793 | A * | 6/2000 | Challener et al. .............. 705/50 |
| 6,272,634 | B1 | 8/2001 | Tewfik et al. |
| 6,282,650 | B1 | 8/2001 | Davis |
| 6,285,776 | B1 | 9/2001 | Rhoads |
| 6,292,092 | B1 | 9/2001 | Chow et al. |
| 6,389,151 | B1 | 5/2002 | Carr et al. |
| 6,449,377 | B1 | 9/2002 | Rhoads |
| 6,512,837 | B1 | 1/2003 | Ahmed |

(Continued)

FOREIGN PATENT DOCUMENTS

WO   WO98/02864   * 1/1998

OTHER PUBLICATIONS

Moskowitz ("So this is Convergence? Technical, Economic, Legal, Cryptographic and Philosophical Considerations for Secure Implementations of Digital Watermarking", Blue Spike, 1998, 98 pages).*

*Primary Examiner* — James D Nigh
(74) *Attorney, Agent, or Firm* — Digimarc Corporation

(57) ABSTRACT

We provide techniques for uniquely linking security elements in identification documents. In one implementation we provide a digital watermark embedded on, and a smartcard chip embedded in, an identification document. The smart card chip includes a hash or a reduced-bit representation of the digital watermark, while the digital watermark includes a hash of information stored on the smartcard chip. In another implementation we cross-correlate encryption keys carried by various machine-readable features on an identification document. In still another implementation, we embed biometric information, which is stored in smartcard electronic circuitry, with a digital watermark. In one case the watermark is reversible, so that it can be removed to yield unmarked biometric information. In another case the watermark is fragile, to reveal whether the biometric information has been subjected to a transformation. In yet another implementation, we provide a jurisdictional indicator on an identification document. The jurisdictional indicator helps in decoding a digital watermark on the identification document.

5 Claims, 5 Drawing Sheets

U.S. PATENT DOCUMENTS

| | | |
|---|---|---|
| 6,527,173 B1 | 3/2003 | Narusawa et al. |
| 6,608,911 B2 * | 8/2003 | Lofgren et al. ............... 382/100 |
| 6,843,422 B2 | 1/2005 | Bi |
| 6,869,023 B2 | 3/2005 | Hawes |
| 6,985,600 B2 | 1/2006 | Rhoads |
| 7,016,516 B2 | 3/2006 | Rhoads |
| 7,055,034 B1 | 5/2006 | Levy |
| 7,111,168 B2 * | 9/2006 | Lofgren et al. ............... 713/176 |
| 7,184,569 B2 | 2/2007 | Lawandy |
| 7,389,939 B2 | 6/2008 | Jones et al. |
| 7,424,131 B2 | 9/2008 | Alattar et al. |
| 7,519,819 B2 | 4/2009 | Bradley et al. |
| 7,639,837 B2 | 12/2009 | Carr et al. |
| 2001/0034835 A1 * | 10/2001 | Smith ............................ 713/175 |
| 2001/0037313 A1 * | 11/2001 | Lofgren et al. ................. 705/67 |
| 2002/0001395 A1 * | 1/2002 | Davis et al. ................... 382/100 |
| 2002/0009208 A1 | 1/2002 | Alattar et al. |
| 2002/0012445 A1 * | 1/2002 | Perry ............................ 382/100 |
| 2002/0080992 A1 | 6/2002 | Decker et al. |
| 2002/0080994 A1 * | 6/2002 | Lofgren et al. ............... 382/100 |
| 2002/0116509 A1 | 8/2002 | DeLaHuerga |
| 2002/0170966 A1 | 11/2002 | Hannigan et al. |
| 2003/0117262 A1 | 6/2003 | Anderegg et al. |
| 2003/0138128 A1 | 7/2003 | Rhoads |
| 2004/0049401 A1 | 3/2004 | Carr et al. |
| 2004/0181671 A1 | 9/2004 | Brundage et al. |

* cited by examiner

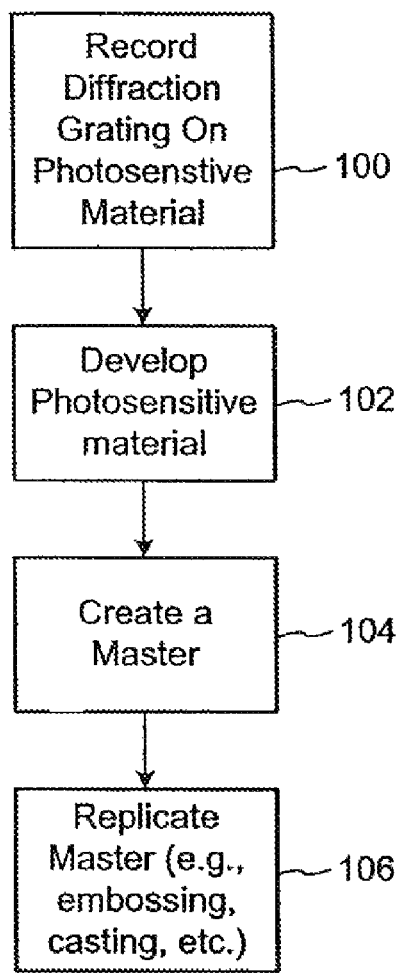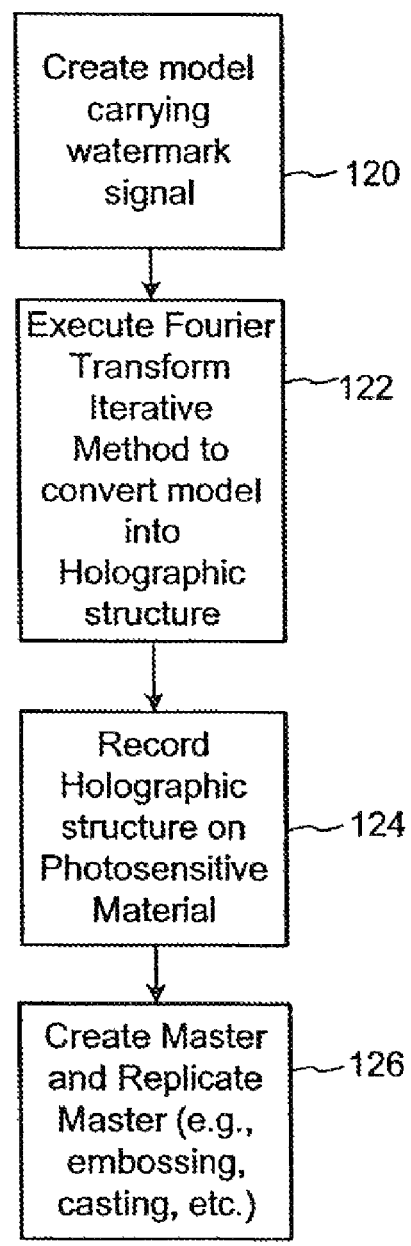

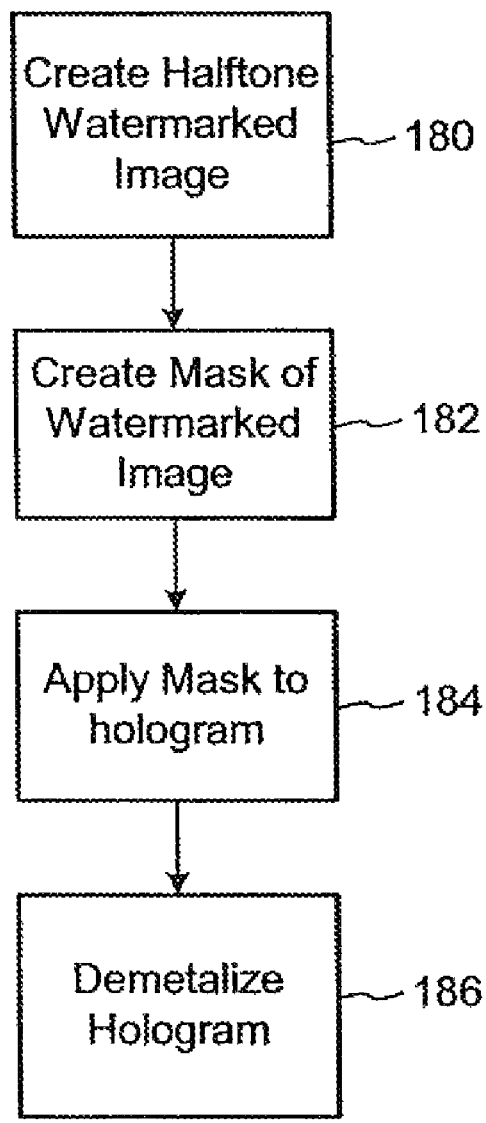
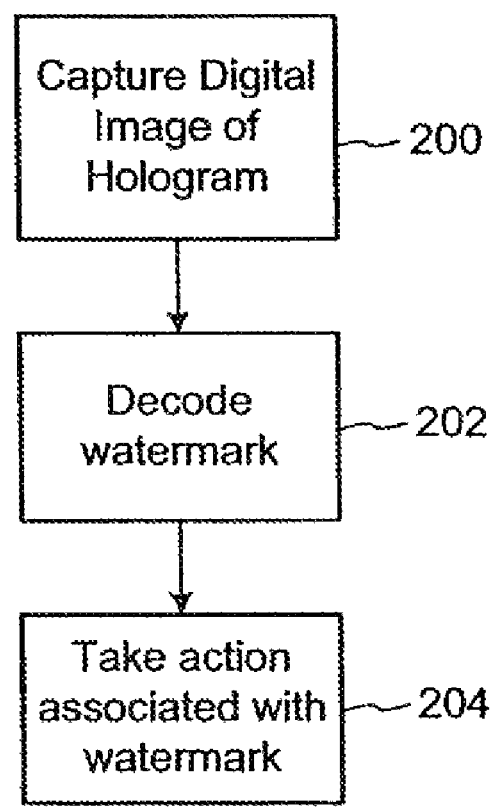

UNIQUELY LINKING SECURITY ELEMENTS IN IDENTIFICATION DOCUMENTS

RELATED APPLICATION DATA

This application is a division of application Ser. No. 10/893,149, which claims priority to provisional application 60/488,536, filed Jul. 17, 2003.

The subject matter of this application is related to that disclosed in U.S. Pat. Nos. 5,841,886, 5,862,260, 6,122,403, 6,389,151, 6,614,914, 6,752,432, and 6,754,377, and in patent application Ser. No. 09/790,322 (filed Feb. 21, 2001, now U.S. Pat. No. 7,111,168), Ser. No. 10/094,593 (filed Mar. 6, 2002, published as US20020170966), Ser. No. 10/172,506 (filed Jun. 14, 2002, now U.S. Pat. No. 6,869,023), Ser. No. 10/282,908 (filed Oct. 28, 2002, now U.S. Pat. No. 6,782,115), Ser. No. 10/319,404 (filed Dec. 12, 2002, published as US20030149879), Ser. No. 10/329,318 (filed Dec. 23, 2002, published as US20030178495), Ser. No. 10/330,033 (filed Dec. 24, 2002, published as US20040011874), Ser. No. 10/370,421 (filed Feb. 19, 2003, published as US20040049401), Ser. No. 10/686,495 (filed Oct. 14, 2003, published as US20040181671, now abandoned), Ser. No. 10/686,547 (filed Oct. 14, 2003, published as US20040158724), Ser. No. 10/723,181 (filed Nov. 26, 2003, published as US20040263911), Ser. No. 10/742,510 (filed Dec. 19, 2003, published as US20050001419), Ser. No. 10/794,395 (filed Mar. 5, 2004, published as US20040258274), and Ser. No. 10/816,175 (filed Mar. 31, 2004, published as US20050010776).

The foregoing documents are hereby incorporated by reference.

TECHNICAL FIELD

The present invention relates to digital watermarking and integrating digital watermarking methods with information carriers (e.g., credit cards, smart cards, RFID cards, magstripe cards, etc.).

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark. Several particular watermarking techniques have been developed. The reader is presumed to be familiar with the literature in this field. Particular techniques for embedding and detecting imperceptible watermarks in media signals are detailed in U.S. Pat. Nos. 6,614,914 and 5,862,260.

Digital watermarks can be exploited in a variety of applications, including authenticating electronic and physical objects and counterfeit deterrence. They may also be used in conjunction with other security technologies.

Optically Variable Devices (OVDs) are another type of technology used in security applications. OVD is a class of devices that includes Diffractive Optically Variable Image Devices (DOVIDs), such as holograms. Within the field of holography, there a variety of types of DOVIDs including, for example, Exelgram™, Kinegram™, and Pixelgram™ DOVIDs. This document uses the term hologram to generally encompass diffractive devices, including DOVIDs manufactured on metallized or clear film, by the replication of a surface relief pattern (e.g., embossed hologram), through laser exposure (e.g., photopolymer holograms), or other known processes. The state of the art of manufacturing holograms offers several methods for creating a diffraction pattern and mass reproduction of them.

FIG. 1 is a diagram illustrating a process of creating a master hologram and reproducing it. To create a master hologram, the method records a diffraction grating on a photosensitive surface, such a photoresist plate (100). The diffraction grating represents an interference pattern of two interfering beams of light. One way to form this interference pattern is to use a diffusely reflecting three-dimensional model. The model is illuminated by a laser whose output passes through a beam splitter to create separate beams. One of the beams is directed as a reference beam onto the photoresist for interference at a finite angle with another beam reflected from the model.

The photoresist is developed to create a surface relief pattern of the diffraction grating (102). Next, a highly reflective, opaque layer is applied to the surface relief pattern to create a reflective hologram. An image can then be reconstructed and viewed by reflecting light from an ordinary light source. A first order diffracted beam reconstructs the image.

The hologram may be used to create a second hologram. For example, a first hologram is illuminated with coherent light from a laser to reconstruct an image of the original model. A photoresist plate is placed at the location of the reconstructed image. In order to form a new hologram, a beam splitter is positioned in the laser output beam in order to direct a portion of its intensity directly onto the photoresist plate for interference at a finite angle with a first order diffracted beam that is diffracted from the first hologram.

In the process of creating a hologram, several exposures, each with different masks and grating parameters, may be used. For each exposure, the mask controls the portions of the photoresist plate to be exposed. Computer driven machinery may be used to create discrete grating dots or pixels at resolutions of 50 to 2000 dots per inch (dpi). These types of diffraction gratings are sometimes referred to as dot matrix OVDs.

To mass produce the hologram, a metal master of the surface relief pattern is created from the developed photoresist (104). One way to do this is to use a metal electroforming process to apply a metal layer on the developed photoresist plate. The resulting metal layer becomes a surface relief master used to replicate the surface relief pattern (106).

There are a number of ways to reproduce the hologram using the surface relief master. One way utilizes an embossing technique where the metal surface relief master is urged against thin, smooth, clear plastic film under an appropriate amount of pressure and heat in order to form a replica of that surface relief pattern. A second way utilizes a casting technique, where the surface relief metal master is used as a mold to which a clear liquid resin is applied and cured between an optically clear flexible plastic substrate and the master mold. A continuous casting process is used where the master hologram is fitted on the outside of a drum over which the substrate passes, and the resin is cured by passing ultraviolet light through the substrate while in contact with the master.

After reproducing the surface relief pattern on a film, a highly reflective, opaque layer is formed on the surface relief pattern. One way to do this is to evaporate aluminum onto the surface relief pattern formed on the film.

There are a number of alternative ways to create holograms. Another type of hologram is a Denisyuk hologram. Denisyuk holograms are recorded on silver halide film, photopolymer film or dichromated gelatin film. The resulting hologram is laminated into a card or applied to product as a tag or label.

Diffraction gratings can be creating without using light interference, but instead, using microlithography engraving technologies. This class of diffraction gratings may be classified as "non-optically recorded diffraction gratings." Microlithography based OVD recording technologies, like electron-ion lithography, are used to form diffraction gratings with desired optical properties. Examples of such gratings include binary, blazed, curvilinear, and subwavelength (less than the wavelength of visible light) gratings.

Rather than using physical models, light sources and optical elements, diffractive structures may also be generated by computer (Computer Generated Holograms—"CGH"). For a CGH, a computer makes wavefront calculations to compute the hologram's surface profile or transmission characteristics. To create a master, the resulting holographic structure may be recorded optically by projecting a map of the computer generated holographic structure onto a photosensitive material, or using microlithography such as e-beam lithography to record the holographic structure on a surface of a master. A variety of computer implemented methods, such as Fourier Transform iterative algorithms, are described in published literature relating to computer generated holograms. See P. Stepien, Computer Generated Holograms and Diffraction Gratings in Optical Security Applications In Optical Security and Counterfeit Deterrence Techniques III, Rudolf L. van Renesse, Willem A. Vliegenthart, Editors, Proceedings of SPIE Vol. 3937 (2000).

The invention provides methods for integrating digital watermarks into holograms, watermarked hologram structures, and related applications. One aspect of the invention is a method of embedding a digital watermark in an optically variable device. This method creates a watermark image, and then embeds the watermark image into a holographic structure. Such a watermarked holographic structure can be used in connection with an information carrier, such as a smart card, credit card, integrated circuit card, RFID card, magnetic-stripe card, etc. The digital watermark caries information to assist in authenticating the card, the holograph and/or the card holder.

Another aspect of the invention is a method for integrating a digital watermark into a hologram. This method creates a halftone watermarked image, and forms the halftone watermarked image in the hologram by creating hologram dots corresponding to the dots in the halftone watermarked image.

Another aspect of the invention is a watermark reader operable to decode a watermark from a watermarked hologram. The decoder comprises a watermark decoder and message decoder. The watermark decoder detects a watermark signal in an image scanned from a watermarked hologram. The message decoder extracts a message from the watermark signal.

Further features will become apparent with reference to the following detailed description and accompanying drawings.

BRIEF DESCRIPTION OF THE DRAWINGS

FIG. 1 is a diagram illustrating a process of creating a master hologram and reproducing it.

FIG. 2 is a diagram illustrating a method for embedding a watermark in a hologram image.

FIG. 5 is a flow diagram illustrating a process for embedding a watermark signal into a hologram where the physical structure of the hologram is modulated to carry a watermark signal.

FIG. 6 is a flow diagram illustrating a method for reading the watermark embedded in a hologram according to the method shown in FIG. 5.

DETAILED DESCRIPTION

Figure 3:
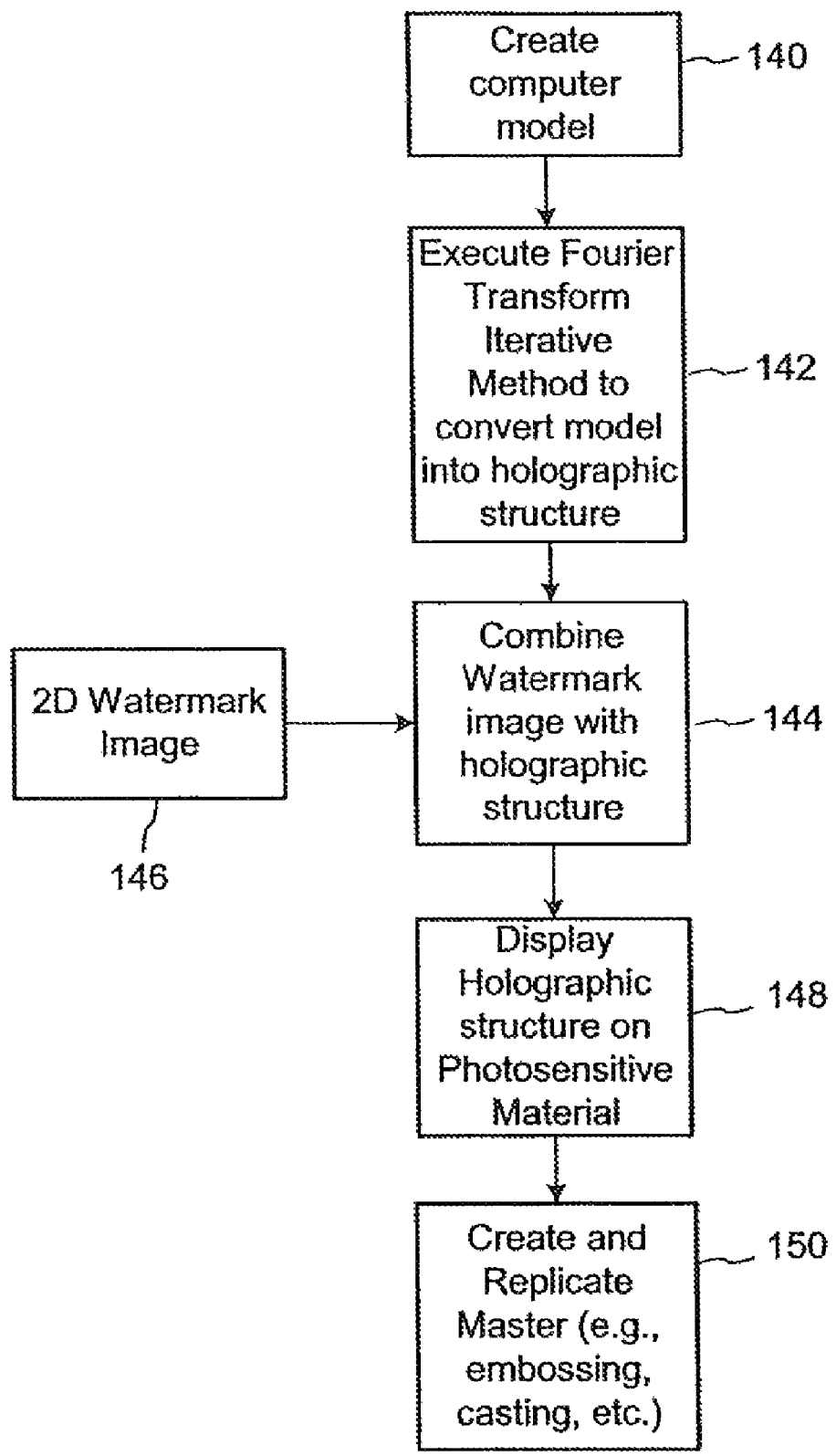
FIG. 3 is a diagram illustrating an alternative method for embedding a watermark in a hologram image.

This document provides a number of ways to integrate digital watermarks into OVDs, such as holograms. First, the following description provides a description of digital watermark embedding and reading operations. Next, it describes methods for integrating watermarks into OVDs. Finally, it describes applications of watermarked holograms.

Watermark Embedding and Reading Operations

There are a variety of known methods for embedding digital watermarks into images and reading the watermark from a watermarked signal. This section describes examples of digital image watermark methods suitable for integrating with OVDs.

In the following digital watermark method, an embedder modulates a carrier signal with a message comprising one or more binary or M-ary symbols to create a watermark signal. The embedder then embeds the watermark signal into the host image by modulating characteristics of the host such that they carry the watermark signal. The host image may be a multi-level per pixel image representation such as an array of N-bit luminance values (or multilevel color vector per pixel), or a halftone image where each element has a binary value of on or off.

One way to embed the watermark signal into a multilevel per pixel image is to add it to spatial or transform domain samples of the host signal.

Similarly, the watermark signal may be embedded in a halftone image with the following variation. First, a multi-level per pixel watermark signal is created at the resolution of a target halftone image. The watermark embedder produces a multilevel per pixel watermark signal at the desired resolution of the halftone image, or at some other resolution and up or down samples it to match the resolution of a target halftone image. This watermark signal is then added to the host image at the same spatial resolution to create a composite, watermarked image. An error diffusion process or some other type of halftone process may then be applied directly to this composite image to generate a watermarked halftone image. This technique applies to a variety of halftone processes including ordered dithering (e.g., blue noise masks, clustered dot halftones, etc.) as well as error diffusion halftone processes.

There are a variety of ways to generate the watermark signal. One approach takes an auxiliary message comprising binary or M-ary symbols, applies error correction coding to it, and then spread spectrum modulates the error correction encoded message. One way to spread spectrum modulate the message is to spread each binary symbol in the message over a pseudorandom number, using an exclusive OR operation or multiplication operation. The resulting binary message elements in the spread spectrum modulated message signal are then mapped to spatial image locations. The watermark signal may be expressed in a binary antipodal form, where binary symbols are either positive or negative. To increase robustness, the spread spectrum modulated message signal may be repeated throughout the host image, by for example, embedding the message signal in several blocks of the host image. In particular, the watermark encoder may embed instances of the watermark signal into contiguous blocks of pixels throughout a portion of the host image or throughout the entire host image.

Perceptual modeling may be applied to the host image to calculate a gain vector with gain values that correspond to the message signal elements. For example, in the case where the upsampled watermarked signal is added to the host signal, the gain values may be used to scale binary antipodal values of the message signal before adding them to the host signal. Each gain value may be a function of desired watermark visibility and detectability constraints. In particular, the perceptual model analyzes the image to determine the extent to which it can hide a corresponding element of the watermark image. One type of an analysis is to compute local contrast in a neighborhood around each pixel (e.g., signal activity) and select gain for a pixel or group of neighboring pixels as a function of local contrast. A detectability model analyzes the host signal to determine the extent to which pixel values are biased toward the value of the watermark signal at the corresponding pixel locations. It then adjusts the gain up or down depending on the extent to which the host image pixels are biased towards the watermark signal.

This type of watermark may be read from the watermarked halftone image (e.g., binary bit map) or other image representations of that watermarked image, such as a multilevel per pixel representation of the image at a resolution sufficiently high to represent the watermark signal. To decode the watermark, a watermark decoder detects the presence and orientation of the watermark in the watermarked image. It then performs an inverse of the embedding function to extract an estimate watermark message signal.

The message signal is robustly encoded using a combination of the following processes:

1. repetitively encoding instances of a message signal at several locations (e.g., blocks of the image);

2. spread spectrum modulation of the message, including modulation techniques using M sequences and gold codes; and 3. error correction coding, such as convolution coding, turbo coding, BCH coding, Reed Solomon coding, etc.

The watermark decoder reconstructs an embedded message from the estimated watermark signal by:

1. aggregating estimates of the same message element in repetitively encoded instances of the message;

2. performing spread spectrum demodulation, and 3. error correction decoding.

In one implementation, the decoder uses an orientation signal component of the watermark to detect its presence and orientation in the watermarked image. It then performs a predictive filtering on the image sample values to estimate the original un-watermarked signal, and subtracts the estimate of the original from the watermarked signal to produce an estimate of the watermark signal. It performs spread spectrum demodulation and error correction decoding to reconstruct an auxiliary message embedded in the watermarked signal.

For more details about embedding an image watermark, and detecting and reading the watermark from a digitized version of the image after printing and scanning see U.S. Pat. Nos. 6,614,914 and 5,862,260, which are mentioned above. In order to make the watermark robust to geometric distortion, the watermark includes an orientation watermark signal component. Together, the watermark message signal and the orientation watermark signal form the watermark signal. Both of these components may be added to a host image at the resolution of the halftone image before the host image is converted to a halftone image. Alternatively, these components may be combined to form the watermark signal used in modulating the error diffusion threshold used in an error diffusion type halftone process.

One type of watermark orientation signal is an image signal that comprises a set of impulse functions in the Fourier magnitude domain, each with pseudorandom phase. To detect rotation and scale of the watermarked image (e.g., after printing and scanning of the watermarked image), the watermark decoder converts the image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

The image watermarks described above may be used in combination with one or more other watermarks. In one application, for example, a robust watermark is used to carry a key that specifies the dot locations of a halftone watermark. In particular, the robust watermark's message payload carries a key that identifies specific dots (the high-resolution binary values) that were turned on or off in a specific pattern. These binary valued bits act as a secondary fragile watermark that can be verified by close inspection of the image. In particular, to authenticate the watermarked object, the user scans the object with a high resolution scanner capable of discerning the halftone dots and then uses the watermark decoding software described above to decode the robust watermark payload specifying the locations of the fragile watermark dots. The software then checks the high resolution scan for the presence of the dots in the fragile watermark.

Using the techniques described in this document, the implementer may embed robust, fragile or combinations of robust and fragile watermarks in holograms. A robust watermark is a watermark designed to be readable despite transformations to the signal that carries the watermark. A fragile watermark is one in which the watermark signal degrades or becomes unreadable as a result of transformations to the signal carrying the watermark. In applications involving watermarked holograms, these transformations may include operations involved in reproducing the hologram, e.g., attempting to reproduce a surface relief pattern. The degradation of a fragile watermark can be measured by determining the decrease in the signal energy of the detected watermark relative to a threshold.

As noted, some applications can advantageously use both robust and fragile watermarks. The robust watermark persistently carries machine readable information such as a digital message conveying information or a machine instruction relating to the object on which the watermarked hologram resides, or an index to a database entry carrying such information or instructions. It may also include information about the fragile watermark, such as a decoding key indicating how to detect and read the fragile watermark. The presence or absence of the fragile watermark indicates tampering with a hologram. In addition, the fragile watermark may include a digital message.

Integrating Watermarks into OVDs

In this section, we describe methods for integrating watermarks into holograms. FIG. 2 is a diagram illustrating a method for embedding a watermark in a hologram image. In this method, a watermark embedder uses the technique described above to embed a watermark signal into a computer model used to create a computer generated holographic structure. The computer model represents a 2D or 3D image. The computer model carries the watermark signal in a manner that survives the transformation of the model to a holographic structure and subsequent manufacture of the holographic structure.

The process begins by creating a 2D or 3D digital image model that carries the watermark signal (120). This model is a digital representation comprising an array of discrete samples (e.g., the robust watermark pixels) corresponding to spatial locations in a two-dimensional plane, for a 2D image, or a three dimensional space, for a 3D image. First, a watermark embedder generates the watermark signal by spread spectrum modulating a binary message. The embedder maps the elements in the resulting array of values to spatial locations within the model. For 2D image models, it maps the elements of the watermark signal to samples in a 2D block of the 2D image model. For 3D image models, it maps the elements of the watermark signal to the surface of an object represented in the 3D model. It then modulates the sample values of the model at those locations according to the corresponding values in the watermark signal. There are a number of alternative ways to modulate the sample values of the model. The following paragraphs detail some examples.

In the case of a binary image where the sample values are one of two states, the embedder modulates the values using the halftone embedding process described above. In the case of multi-valued image (e.g., 8 to 32 bits per pixel), the embedder modulates the values by increasing corresponding sample values to encode a 1 and decreasing corresponding sample values to encode a zero. Each element of the watermark signal may modify a single sample or group of neighboring samples at a corresponding location in the model.

In the case of a three dimensional image representing the surface of an object, another approach is to modulate the geometric structure of the object's surface. In particular, the embedder creates a peak in the surface to encode a one from the watermark signal, and creates a trough in the surface to encode a zero. The surface modulation may be in the form of a binary anti-podal watermark signal, where binary elements increase or decrease the surface positions by a fixed amount. Each binary element of the watermark signal may be mapped to a smoothly varying peak or trough that modulates the position of a group of neighboring surface elements. Each of these peaks and troughs in the resulting holographic structure create discrete positive or negative fluctuations in light intensity when the holographic structure is illuminated and imaged at a particular orientation and focal plane. As such, the embedder modulates selected surface elements of the model such that the variations in light intensity created by the peaks and troughs are discernable at the particular orientation and focal plane.

Next, a holographic structure generator makes wavefront calculations to convert the model into a holographic structure (e.g., a kinoform). In particular, an iterative Fourier transform wavefront calculator converts the model into a holographic structure (122). For more information about such methods, see P. Stępień, R. Gajda and T. Szoplik, "Distributed kinoforms in optical security applications," Opt. Eng. 35, pp. 2453-2458, (1996); and P. Stępień, and R. Gajda, "Pure-phase iteratively generated Fourier hologram as a security mark," SPIE Proc. 2659, 223-228 (1996).

The process then records the holographic structure on a physical medium. As shown in FIG. 2, one approach is to display the structure on a photosensitive material such as a photoresist and develop the photoresist to create a surface relief pattern (124). Another approach is to use microlithography to re-create the holographic structure on a physical substrate.

The process creates a master by, for example, using electroforming to reproduce the surface relief pattern on a metal master (126).

FIG. 3 is a diagram illustrating an alternative method for embedding a watermark in a hologram image. In this method, the watermark embedder uses the technique described above to create a two dimensional watermark image (146). The discrete elements of the watermark signal are mapped to locations in a block of image sample locations. This block is replicated to expand it to the desired size. This image is then optically merged with the hologram image such that the resulting holographic structure includes a composite of the watermark image and the hologram image.

The process illustrated in FIG. 3 is similar to the one shown in FIG. 2 except that the watermark signal is introduced into the holographic structure as a 2D image. As in FIG. 2, this process creates a computer image model (140) and uses a holographic structure generator to convert the model into a holographic structure (142). It then combines the holographic structure with the 2D watermark image (144, 146). In particular, the two-dimensional watermark image and the hologram image can be transformed to the holographic structure such that they reside at distinct focal planes relative to each other.

The process of recording the holographic structure on a physical medium (148), creating a master, and reproducing the hologram using the master (150) are the same as described for FIG. 2. The hologram may be replicated on a card (such as a credit card), identity document (passport, driver's license, etc.), value document (bank note, stock certificate, ticket, etc.), product label (e.g., product package, hand tag, sticker, etc.).

While the processes of FIGS. 2 and 3 are specifically implemented using software for computer generation of a hologram structure, the same processes may be implemented using conventional analog methods and physical optical and imaging devices. For example, rather than employing computer generated holography to create a holographic structure, the implementer can use a 3D physical model in which the digital watermark is embedded by surface modulation of that 3D model. Using the techniques described in the background and summary above, this implementation records an interference pattern of coherent light reflected from the model and a separate beam of coherent light directed to a photoresist material. Since the 3D physical model is optically recorded in the physical holographic structure on the photoresist, the watermark signal carried in the surface of that model is recorded as well.

Alternatively, the implementer may optically merge an optical projection of a watermark image on the photoresist. The watermark image may be created by mapping a spread spectrum watermark signal to discrete image locations, or may be created by modulating the pixels of a host image, such as a halftone or multilevel per pixel image, with a spread spectrum watermark signal using the watermark embedding techniques described previously. In separate holographic recording processes, the photoresist records one or more interference patterns of holographic structures. The resulting photoresist includes a composite of the watermark image and interference patterns of holographic structures. To mass produce the holographic structure, the manufacturer develops the photoresist and creates a metal master, which may then be used to create replicas of the holographic structure using embossing or casting techniques.

Figure 4:
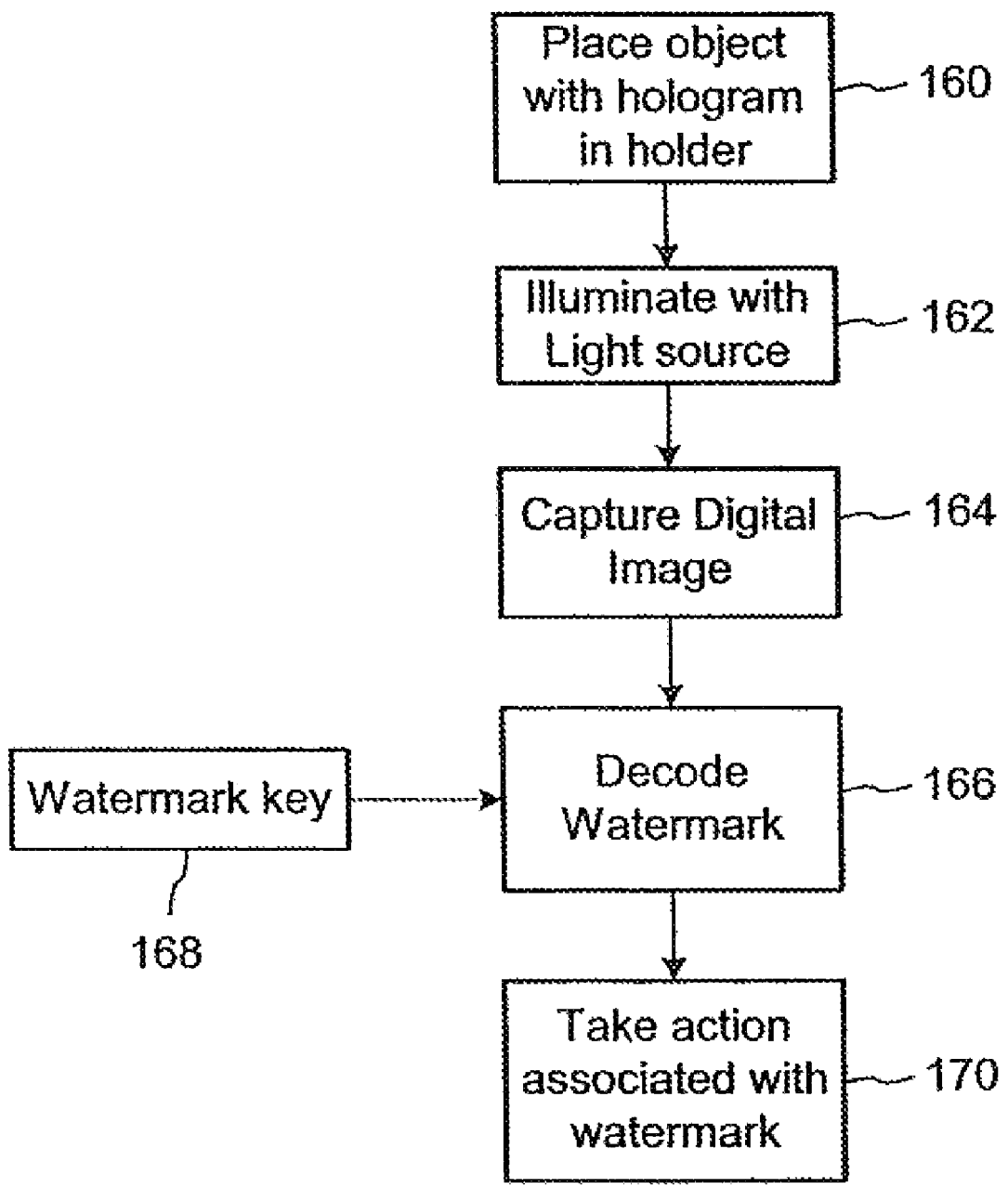
FIG. 4 is a flow diagram illustrating a process of decoding the watermark signal from the holograms created in FIGS. 2 and 3.

FIG. 4 is a flow diagram illustrating a process of decoding the watermark signal from the holograms created in FIGS. 2 and 3. First, a user places an object bearing a watermarked hologram into a holder (160). Then, a reader device including a light source and a digital camera illuminates the hologram (162) and captures a digital image (164) of an image formed by illumination of the hologram at a pre-determined focal plane and orientation. The type of illumination, either coherent light from a laser, or white light from white light source, depends on how the watermark signal has been embedded into the hologram. The watermark signal may be embedded in the hologram's model (FIG. 2) or added to the holographic structure (FIG. 3) so that it is visible at a particular focal plane using laser illumination. Similarly, it may be embedded in the hologram's model or added to the holographic structure (FIG. 3) so that it is visible at a particular focal plane using normal white light illumination. The focal plane where the watermark signal is readable may be kept covert. This makes the watermark signal difficult to detect and reproduce by hackers. For example, as noted previously, watermark image signal may be transformed into the holographic structure such that forms a hologram viewable at a different focal plane relative to other 2D or 3D images transformed into the holographic structure.

Once the digital image is captured at the desired focal plane, the watermark decoding process described previously decodes the watermark signal (166) using a watermark key (168), which specifies parameters, such as the pseudorandom carrier signal (or its seed number) used to spread spectrum modulate a message, an orientation signal, block size and resolution of embedding, etc. In some applications, such as authentication, detecting the presence of a valid watermark signal is sufficient to authenticate the object bearing the hologram. In other applications, the watermark message carries useful information, such as information about the bearer or issuer of the authentic object, or an index to a database entry storing such information. Since the digital image is captured at a desired focal plane, the orientation signal is not always necessary to calibrate the watermark decoder before reading the message. However, the orientation signal alone may serve as an authenticating watermark, and its presence indicates authenticity of the object bearing the hologram. In this case, there is no need for a spread spectrum carrier of a message.

After reading the watermark, the reading device (e.g., a networked personal computer connected to the light source, camera and holder) takes an action or set of actions associated with the watermark (170). This may include displaying a message indicating whether the object is authentic, displaying the embedded message, fetching relating information from a database using an index embedded in the watermark to index a database entry storing that related information, etc. A URL, for example, may be embedded in the watermark or stored in the database entry. In response to receiving the URL from the decoder or database, the reader fetches, or launches an internet browser to fetch, data stored at a network device at the URL, such as a web page, XML content, etc.

Another method of integrating a digital watermark in a hologram is to construct the hologram as a series of discrete dots or pixels. The dots collectively form a two-dimensional signal comprised of discrete elements that may be modulated using the above techniques to carry a watermark. In one example of this approach, the watermark embedder creates a watermarked halftone image using the technique described above. Then the binary elements in the resulting halftone image are converted to discrete hologram dots in a hologram formation process.

There are a variety of ways to create the discrete hologram dots. One approach is to create an embossed hologram that extends continuously over a film, and then apply a mask on that film to form a collection of dots that each either expose a hologram dot or mask it according to whether a corresponding bit is on or off in the watermarked halftone image.

Alternatively, a dot matrix hologram method may be used to create an array of discrete diffraction gratings in the form of dots. The diffraction gratings reflect light in a manner that is interpreted distinctly as a binary one or zero. In one implementation, for example, the discrete diffraction grating dots are formed at a resolution ranging from 50 to 2000 dpi using computer driven machinery to record each diffraction grating on a photosensitive plate. After recording the diffraction gratings, the plate is developed and then used to form a metal master of the surface relief pattern. The metal master may then be replicated by an embossing technique.

The orientations of the diffraction gratings are modulated according to a watermark signal created using the watermarking method described in the previous section. The modulation of the orientation of the diffraction pattern encodes a one or zero based on the binary value at a corresponding location in the watermark signal.

To read the watermark from the dot matrix hologram, a digital image reader captures an image of the hologram from a predetermined perspective and orientation. The reader decodes a message by interpreting the image created by the diffraction grating dots of varying orientation. In particular, the orientation of the diffraction gratings creates a distinct image attribute that the reader maps to a one or zero. It then spread spectrum demodulates the resulting binary signal derived from interpreting the images of the diffraction grating dots, and performs error correction decoding to reconstruct an embedded message. It is not necessary to manually align the hologram for reading. Instead, the orientation of the dots can be used to re-align the image before decoding the embedded message.

FIG. 5 is a flow diagram illustrating a process for embedding a watermark signal into a hologram where the physical structure of the hologram is modulated to carry a watermark signal. In this process, the physical structure of the hologram is formed so as to carry the watermark. In particular, the watermark signal is carried in a metalization pattern of a reflective metal layer formed over the surface relief pattern of a hologram.

The process begins by creating a halftone watermark signal using the technique described previously. In one implementation, for example, a multilevel per pixel watermark signal is added to a multilevel per pixel host image at a desired halftone resolution (e.g., 75 to 600 dpi). The resulting watermarked image is then converted into a halftone image at that resolution using a halftoning process. The host image may be a natural image or simply a solid monotone image. In the latter case, the resulting halftone image is an image of the watermark signal because it modulates a solid tone background image. In either case, the halftone watermark signal covers a block of image samples. This block is replicated in a two dimensional array of contiguous blocks to tile the watermark signal in a manner that covers the desired amount of surface area of a hologram. The watermark signal block may be replicated to tile the entire host image, or in case where the watermark signal modulates a solid, single tone image, to tile the desired surface area the hologram.

The resulting watermarked digital image is two dimensional pattern of halftone dots, where each dot has a value representing one of two binary states: either the presence or absence of a dot. In the physical representation of the mask, each dot represents the presence or absence of a metal layer after demetalization.

The process shown in FIG. 5 uses this digital representation to create a mask (182) used to demetalize a layer of reflective metal deposited on a holographic film. The mask includes tiny circular dots of masking material where the metal should remain; otherwise, there is no masking material. A conventional photolithographic process projects the mask (184) onto the metal layer on a holographic film. A protective material is then applied to the halftone pattern of the mask. This material protects the metal that it adheres to from being removed during a subsequent demetalization process (186) (e.g. acid bath) that removes the metal layer on the holographic film not covered by the protective layer. For more details and alternative methods for creating a pattern of dots on a hologram, see U.S. Pat. No. 5,411,296, which is incorporated by reference.

FIG. 6 is a flow diagram illustrating a method for reading the watermark embedded in a hologram according to the method shown in FIG. 5. A watermark decoder can read the halftone watermark from the pattern of reflective dots because a digital image captured of the hologram surface from a digital camera or scanner has light and dark areas corresponding to the presence or absence of a reflective metal dot. These light and dark areas are interpreted as a binary one or zero in a halftone image.

To begin, a reader device, such as personal computer connected to a scanner or digital camera captures a digital image of the dot pattern on the hologram's surface (200). Next, the watermark decoding process described above is used to decode the watermark from the halftone image (202). The decoding process initially performs a detection operation to detect an orientation signal, and then uses the orientation signal to compensate for rotation, spatial scale, and translation distortion. After compensating for the geometric distortion and finding the reference origin for a watermark tile, the reader decodes the message embedded in the spread spectrum modulated watermark signal.

Finally, the reader takes an action or set of actions associated with the watermark signal, or its message payload. The action or actions are application specific. Some examples are listed in the text corresponding to block 170 in FIG. 4, and in the next section.

Applications of Watermarking OVDs

This section describes several applications for watermarking OVDs. One application of digitally watermarking a hologram is to embed a machine readable serial number that uniquely identifies a specific hologram device, a hologram design, or a particular lot of holograms.

Once serialized, the number embedded in a hologram's watermark may be used for a variety of applications, including authenticating the watermark and initiating machine, software or system functions associated with a particular serial number.

In authentication applications, the message carried in the digital watermark may be related to information that is printed or stored in machine readable form on another part of the object in which the hologram resides. For example, the hologram message may contain a first identifier that refers to the bearer or issuer of the object (e.g., credit card, identity document, ticket, etc). A second identifier is printed or stored on the object in a machine readable feature such as a bar code, RF tag, magnetic stripe, magnetic ink, etc. If the watermark is unreadable, or the first and second identifiers do not match, then the object is deemed to be a fake. To constitute a match between the first and second identifiers, the identifiers may satisfy a predetermined relationship, such as one being a one way cryptographic hash of the other, one pointing to a database entry that stores the other identifier, both pointing to a database entries with matching information, etc.

In high value documents such as bank notes, the digital watermark may be used as a covert mark that serves to authenticate the document, acts as a series identification, enables circulation control, and controls the usage of the image scanned from the document (e.g., inhibits reproduction or rendering operations like printing, scanning, and photocopying), etc.

Given that the position of the hologram on a document is usually well known, it becomes a good device to carry machine readable features that are processed in devices such as point of sale machines (credit cards), digital cameras, or banknote sorters. The means of reading could be special laser illumination, visible light illumination, optical reader, or a combination of such.

Now consider an embodiment featuring a smart card having a digitally watermarked hologram placed thereon. A smart card is defined broadly herein to generally include a card-shaped device that carries information. (The definition of a smart card used in this application is broad enough to include so-called radio frequency identification cards— RFID cards.). Typically, a smart card includes a microprocessor and/or memory embedded therein. A memory smart card stores information in electronic circuits, while a microprocessor card can delete and manipulate information stored in associated memory in the card. A smart card communicates via a contact (or contactless) interface. A contact smart card is typically inserted into a smart card reader, thereby making physical contact with the reader. A contactless smart card may have an antenna through which signals are communicated. Of course, a smart card could have both a contact and contactless interface. Smart cards are available from many vendors, including Gemplus International S.A., ActivCard S.A., PubliCARD, Inc., Smart Card Innovators, Inc., Precis, Inc., American Card Technology, among others.

A smart card is typically passive in that it lacks an internal power source. Power can be supplied through a physical interface, or via an external electromagnetic wave (contactless), which energizes the smart card's internal circuits. (Of course, a smart card could be constructed so as to have an internal power source.).

Figure 7:
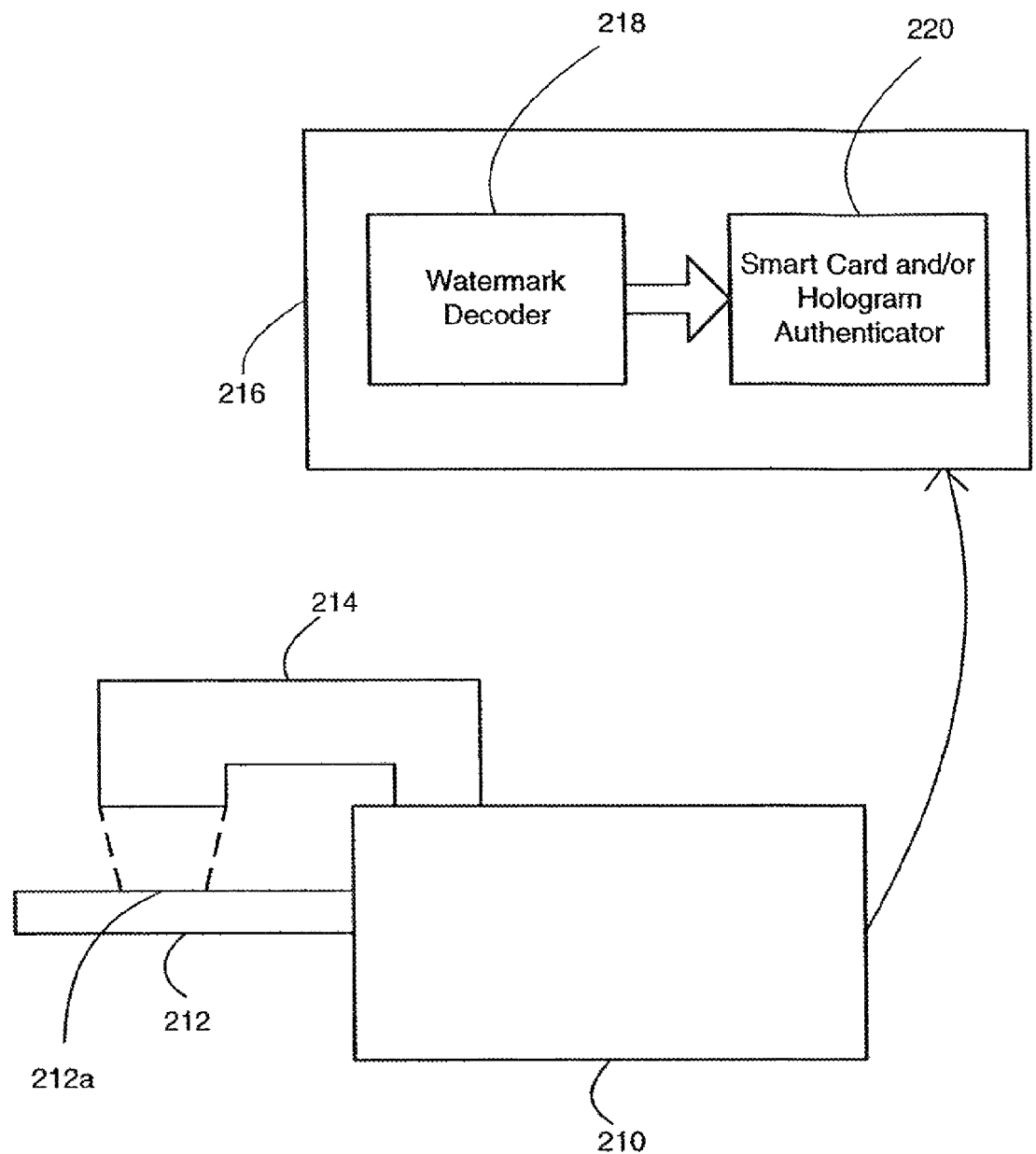
FIG. 7 is a functional block diagram of a system to decode a digital watermark from an information carrier.

With reference to FIG. 7, a smart card reader 210 interfaces with a smart card 212. The reader may be a contact or contactless reader. The reader can extract (or receive) information contained in the smart card, such as credit or account information, customer information, purchasing/payment information, authentication information, credentials, shipping preferences, coupon information, etc. Often this information can be used to verify sufficient funds or credit, authenticate the cardholder, all through information stored in the card, or by indexing information in a network or database via the information stored in the smart card. Smart cards and smart card readers are even further discussed, e.g., in U.S. Pat. Nos. 5,721,781, 5,955,961, 6,000,607, 6,047,888, 6,193,163, 6,199,144, 6,202,932, 6,244,514, 6,247,644, and 6,257,486.

Preferably, a digital watermark is embedded in a hologram 212a carried by the smart card 212. Alternatively, the digital watermark is embedded in a graphic, background, picture or photograph, text, image, logo, etc. on the smart card. An optical (or laser or visible illuminator) reader 214 reads the watermarked area. The reader 214 captures a digital image of the watermarked area (hologram, graphic, text, etc.). The captured image data is communicated to a decoding and authentication module 216 (e.g., a personal computer, dedicated circuitry, mobile or handheld device, remote computer, etc.), which is tethered (e.g., physically or wirelessly) to the smart card reader 210. A watermark decoder module 218 detects and decodes the watermark in the captured image. Of course the reader and decoding and authentication module 216 can be integrated into a single unit. Authenticator 220 determines the authenticity of the smart card 212 (or hologram). For example, and as discussed below, the authenticator 220 may compare a decoded watermark identifier to a predetermined value, to information carried by the smart card, and/or to verification information retrieved from a database. Of course, the authenticator 220 and watermark decoder 218 can be combined, and/or can be realized by computer software instructions running on a general-purpose computer. Alternatively, these modules can be realized by dedicated hardware, or via a hardware/software implementation.

Typically, a digital watermark includes a payload or information bits (e.g., between 8-512 bits). These bits can be used as an additional layer of security, or to provide additional information. In a first embodiment, the information bits are compared with information stored in the electronic circuits of the smart card. A smart card is deemed authentic when the watermark information and the smart card information match, or relate in a predetermined mathematical manner. To illustrate, the watermark information can be used to derive (or decode) the smart card information (or vice versa). Or the sum, product, dot product, hash, combination, etc. of the digital watermark information and the smart card information may yield a predetermined value. Matching or achieving a predetermined value can indicate an authentic card or hologram.

In a second embodiment, the watermark information bits are used as an index to retrieve user data from a data repository. The data repository can include user data such as a photograph of an authorized cardholder, fingerprint data, retinal data, valid passwords, PINS, account information, shipping information, user bibliographic information, company information, etc. U.S. patent application No. 09/571,422, filed May 15, 2000 (now U.S. Pat. No. 6,947,571), discusses some applicable linking features. Such user data can be compared against information provided by the user.

In a third embodiment, the watermark information bits (or payload) include a key, lifespan time limit, and/or an authentication code. Such is compared against predetermined validation information to determine authenticity of the smart card. In the case of a lifespan time-limit, a purchase or authentication will be thwarted when the lifespan time-limit has expired.

Now consider a point of sale location. A purchaser presents her digitally watermarked smart card to a smart card reader. The smart card reader extracts information from the card, e.g., account number, customer information, etc. (In one embodiment, the smart card (or mag-stripe, RFID) carries information to trigger the watermark reader to look for a watermark. This handles a case of legacy cards (e.g., older cards which are not digitally watermarked). In other words, the smart card chip has an indication that triggers the watermark reader to check the hologram. This is to allow reading of new and legacy (marked and unmarked) cards by the same reader.). Returning to the point-of-sale example, a watermark reader (perhaps associated with the smart card reader) captures a watermarked area (e.g., a hologram). A watermark decoder decodes the captured area to determine information bits. These decoded information bits are used to authenticate the smart card (or smart card user). The point of sale location (or terminal) is controlled by the authentication determination. If authenticated, the transaction is carried out. Otherwise, the transaction is terminated, and optionally, reported.

Accordingly, the digitally watermarked information provides security and/or authentication functionality. In some embodiments, the digital watermark information is compared with information stored in the smart card. In other embodiments, the digital watermark information is used to interrogate a database to retrieve additional information.

As noted above, the digital watermark process may be used to encode a robust and/or a fragile watermark. The robust watermark may be used to carry information, such as a serial number. The fragile watermark may be designed to degrade in attempts to counterfeit the hologram. As noted above, the robust watermark message may include a key indicating where the fragile watermark resides (e.g., which locations in a holographic image or pattern of metal dots, etc.). Alternatively, the fragile watermark may be wholly unrelated to the robust mark.

Further, the robust or fragile watermark could be placed in a specific focal plane of the hologram, requiring laser illumination at a specific focal length to capture an image carrying the digital watermark signal, making the digital watermark more covert.

Uniquely Linking Security Elements in Identification Documents

To improve the security of identification documents, it is desirable to include two or more security elements in the document to construct a layered security architecture as described in applications Ser. Nos. 10/686,495 and 10/686,547, mentioned above. The security elements include covert and overt security devices. Overt security devices include security elements that can be identified and verified without machine aid. Examples of overt security devices include optically variable devices like holograms and KINEGRAMS®. The security devices should preferably include machine readable security devices to enable automatic verification. For example, digital watermarks provide a type of security element that is covert and machine readable to facilitate automated verification.

The layered security architecture is enhanced by uniquely linking the security elements together such that alteration of one element modifies the relationship between that element and the other elements. For example, a digital watermark may carry data that is related to data or attributes of other security elements on an identification card, including the printed data, data stored in a smart card chip on the card, Optically Variable Devices like holograms and KINEGRAMS®, laser data media, bar codes, magnetic stripes, etc. The relationship between security elements may be established through a mathematical relationship of the variable message data carried within machine readable elements, or through quantifying attributes of one security element and then embedding the quantified attributes in a machine readable security element. One way to quantify attributes is to measure an image property of one security element (such as its color, luminance, or intensity at various spatial locations), and then embed that measurement, or a hash of that measurement in a machine readable data carrier within another element, such as a digital watermark, smart card chip, bar code, laser readable medium, etc.

To illustrate, consider a specific example where data stored in a smart card is uniquely linked to digital watermarks on the card. The data stored in the smart card memory includes a list comprising hashes of the digital watermarks. In particular, a hash, such as a CRC of the digital watermark message (e.g., before error correction and modulation with a carrier signal as in spread spectrum modulation) of each watermark is stored in the chip. The list may be encrypted to enhance security by restricting access to only those having a decryption key. This encryption makes it more difficult to fake the data stored in the chip. However, even without encryption, the unique relationship between the digital watermarks and data in the chip make faking that data more difficult.

The data in the chip can be uniquely linked to the digital watermarks such that the inter-dependency is multi-directional. In particular, each of the digital watermark messages are augmented with a portion or hash of the data stored in the chip, such as the chip registry. Thus, one security element is hashed and stored in a second security element, and the second security element is hashed and stored back in the first security element.

To embed multiple digital watermarks in an identification card, the digital watermarks may be embedded in different spatial locations and/or security elements, including, a photograph (interchangeably used with "photo") of the bearer, background artwork, a ghost image, a back of the card, in a hologram or Kinegram®, a card laminate, card substrate, in printing, through non-visible wavelength inks (e.g., UV or IR), etc. These digital watermarks may share common data, as well as carry variable data that is unique to that particular watermark.

In a typical identification document, at least one of the digital watermark messages carries data unique to the document, such as a driver's license number, unique serial number, bearer biometric, etc. As such, the list of hashes also uniquely identifies the chip content and links it to the card on which it is stored. This list of hashes may be replicated in a database indexed by an identifier on the card, such as a machine readable code on the card. A comparison of the lists on the card and in the database provides an additional means of verification.

A serial number of a smartcard chip can also be included in the hash stored in one or more of the digital watermarks.

The above example of a layered security architecture utilizing digital watermarks provides a method for fusing security elements together. Since a digital watermark can be extracted automatically from a visible and/or non-visible light scan of the identification card, the same image sensor may be used to read the digital watermark, linear and 2D bar codes, OCR, and facial photo image. All of these elements can be captured in an image of the card, extracted, and then the unique relationship between the elements is checked to verify the card's validity.

By placing a digital watermark inside overt security devices like optically variable devices, the digital watermark facilitates multiple layers of verification, including: verifying integrity of the overt security device (e.g., checking for valid watermark embedded in it), verifying unique linkage with other elements (e.g., checking the relationship between data or attributes of the watermark in the security device with other devices, including a smart card chip), and forensically tracing the identification document to its source, such as its printer (e.g., through a printer ID embedded in the card), and its issuer (through an issuer ID embedded in the card). Additionally, a date/time stamp can be embedded in the digital watermark or other machine readable data carrier on the card to persistently mark the card with its date and time of origin. Similarly, an indicator of the location (e.g., a geo-coordinate or location index, etc.) of the card issuer may be embedded as well.

The Kinegram® optically variable security device is a security element that can facilitate both human verification through its perceptual properties and machine verification through embedded machine readable data, such as a digital watermark. Kinegram® devices can be constructed to create clear perceptual cues for human verification, such as figure ground reversal. In addition, the image conveyed by the Kinegram® can include an embedded digital watermark that is machine readable for automatic verification as described above.

The digital watermark is flexible and adaptable for embedding in many different substrates, printing technologies and over laminates used on identification cards. The substrates include PVC, Teslin, polycarbonate and paper. The printing technologies that may be used to print watermarked images include dye sublimation, color xerography, offset press, digital press, inkjet, and laser engraving. The over laminate includes a clear plastic, metallic, holographic, or UV layers. Digital watermarks embedded in the substrate can carry a message or pattern that verifies the authenticity of the substrate. The digital watermark may also carry a serial number to serialize the substrate of each identification card or lot of cards. The digital watermark in the card's substrate, printing or laminate may also carry a number or pattern identifying the source of manufacture and/or printer origin.

Digital watermarks may be used to verify a variety of graphical elements by carrying covert data or patterns that indicate the authenticity of the graphical elements. Since the digital watermark is covert and difficult to reproduce, graphic elements on fake cards will likely not have a readable digital watermark signal, thus, distinguishing them from originals. Examples of graphical elements that can be modified to carry digital watermarks include raster graphics, guilloche patterns and microprint, split fountain and/or rainbow printing, and fine line artwork (see, e.g., U.S. Pat. No. 6,449,377, which is herein incorporated by reference). The color or luminance of the graphical elements can be modulated as described above to carry the digital watermark signal.

In addition to carrying identifiers and data linked to other data on the document, the digital watermark may also carry a user password or hash of such a password that is compared with a password supplied by the user for verification.

Having described various security elements and their relationship with digital watermarks on the document, the following is an example of a verification process:

1. Scan image of ID card with visible light/invisible light scanner to capture card image;
2. Read other machine-readable data carriers based on image scan (e.g., bar code, OCR, etc.);
3. Read data on smart card;
4. Verify presence of one or more digital watermarks in security elements;
5. Verify integrity of the document:
   a. check inter-relationship of digital watermark payloads; and b. check inter-relationship of digital watermark payload and other data carriers (e.g., smart card, laser readable media, bar code, magnetic stripe, etc.);
6. Verify the identity of the bearer
   a. one or more digital watermark payloads include a PIN, password or other user secret used to challenge the bearer;
   b. check the digital watermark in ID card photo is properly associated with photo through image signature carried in the digital watermark; and
   c. verify biometric data on card:
      facial template derived from photo on card that has been verified using digital watermark in photo
      biometric data stored in machine-readable data carrier on card is verified by checking unique relationship between that data and another data carrier on the card, namely, a digital watermark;
7. Authorize an on-line transaction: a digital watermark in a feature on the card is used as a verification token to confirm that the document is physically involved in the on-line transaction; and
8. Perform forensics on the identification document:
   a. check integrity of security elements and their origin via embedded digital watermark in each security element (embedded digital watermark presence identifies validity and payload identifies source for forensic tracing to the source); and
   b. check document integrity and origin using embedded tracing information (such as time-date stamp, issuer ID, printer ID, etc.).

By capturing an image of security elements, a number of verification operations can be performed as outlined above. These operations can be used in various combinations, depending on the desired security and type of transaction being performed (e.g., access permission, e-commerce transaction, age verification, bearer authentication, etc.). Also, the digital watermark in one element can be used to identify which other security elements are present to communicate to the verification system how to verify the document. This approach is particularly useful in back office verification of the document, where no other Point of Sale or Point of Transaction devices are needed other than a standard document imager or swiper. The image of the card is conveyed to a verification system that analyzes all of the security elements to make sure they are present and have the proper inter-relationships. The digital watermark indicates which security elements are present, and the system performs the verification. The user or user's transaction is interrupted only when a security flaw is detected. The verification process need not be run at all times, but can be initiated in response to a verification event triggered by inputting parameters of the transaction (such as user ID, type of transaction, transaction history, etc.) into a rule base or neural net that triggers verification when an abnormal or risky transaction is detected. Each of these parameters may be supplied to the rule base by the digital watermark, or a database indexed by data on the card (such as the digital watermark or other data carrier). This type of verification process limits interruptions to most transactions, and limits circumstances in which the user is requested to supply other security information, such as a PIN, password, or in which the card has to be re-scanned by the same or some other verification device.

Use of Encryption or Watermarking in Linking Security Elements on Identification Documents In application Ser. No. 10/816,175, cited above, we described how to use encryption, and specifically, private and public key pairs, to link data carrying security elements on documents and other objects to facilitate verification. There are a variety of ways of using encryption or similar randomization process to tie data in security elements together. Some further examples include:

1. All or part of the public key for one data-carrying element is embedded in another data carrying element (e.g., digital watermark, smart card, laser readable media, machine readable optically variable device, bar code, magnetic stripe, etc.);

2. Random data (e.g., purely random or pseudo random generated by a pseudo random number generator seeded by a key) is XOR'd or otherwise mathematically combined with data carried in one security element to produce data encoded in another security element; and 3. Jurisdiction data that is mathematically combined with or stored in/with data in one security element is encoded in another security element.

In an alternative implementation, jurisdictional information is used as a digital watermarking key, instead of an encryption key, to help decode a digital watermark. A watermark key in this context reveals some secret about a watermark or watermark embedding or decoding process. For example, the key reveals information about a watermarking protocol, a watermark embedding/decoding characteristic and/or a watermark payload encryption key. In one implementation a key provides a pseudo-random sequence that is used to embed the watermark. In another example, a key specifies locations for watermark embedding, host signal features to be modified to effect embedding, and/or semantic meaning of particular features (e.g., how modifications to the host signal are mapped to particular data symbols, such as binary or M-ary symbols), etc., etc. The jurisdictional information can be used as an index to locate an appropriate key. Or the jurisdictional information can be combined with other data to form a key. Still further, the jurisdictional information itself can be used as a watermarking key.

Another example is to link machine-readable information from an laser engraved area to help decode a digital watermark. In one implementation we provide a reader which images the card to capture both the laser engraved area and an area including a digital watermark. (Sometimes these areas overlap, or a digital watermark is provided through the laser engraving.) The reader preferably captures the laser engraved area and the digitally watermarked area using a single optical scanner, but the present invention is not so limited. The machine-readable information of the laser engraved area includes a watermark key (or encryption key), which is used to decode the watermark (or to be paired with, e.g., a public key for decrypting auxiliary information). The curious reader is referred to U.S. patent application Ser. No. 10/330,033 (US20040011874), Ser. No. 10/742,510 (US20050001419) and Ser. No. 10/794,395 (US20040258274), cited above, for related methods and/or environments.

Instead of laser engraving, an optical memory card, like that provided by LaserCard Systems Corporation, headquartered in Mountain View, Calif. (e.g., via their LaserCard and LaserCard 600-Q Optical Card Drive) can be used to provide machine-readable information, which can carry a key to decode, decrypt or help find a digital watermark. (LaserCard's promotional material suggests that its optical memory card contains a reflective optical recording medium sandwiched between transparent, protective layers. Information is stored n the card as a binary code, where ones and zeros are represented by either the presence or absence of physical "spots" on the recording media. The spots are tiny—as small as 2.25 microns.) In some case we align an imagining sensor so that both optically recorded information and a digital watermark can be read by the same imagining sensor.

More on Using OVDs for Document Verification

Some OVDs, e.g., Kinegrams®, have the property that they depict different images from different points of view. This can be exploited in automatic verification of these security devices by using an image scanning system that captures images of the security device from different points of view. These images can be designed to have a predetermined relationship with each other that is both manually verifiable by visible inspection and automatically verifiable by comparing the images with expected images and/or each other. Each of these images may be separately embedded with the same or different digital watermarks. In this case, the presence of the digital watermarks and the relationship of their data payloads with each other or other data on the document can be used to verify the document as described above.

One way to further optimize the usability of the OVD, and in particular the Kinegram®, is to create an image that optimizes the figure ground reversal effect. In particular, in one implementation, a Kinegram® on a document has two distinct image structures, one being the reversal of the other in the context of a figure ground reversal. One image is visible when the document is held at a normal orientation, e.g., zero rotation, while a figure ground reversal is visible at an orientation of 180 degrees. This implementation enhances ease of manual verification and simplifies the process of capturing digital image scans of each image for further verification processing by computer. Verification may include comparison of the two images with each other or expected images, as well as digital watermark extraction from one or both of the images and then verification using the digital watermark as described above.

Digital Watermarks in Data Stored in Smart Card Chip

Another way that digital watermarks can be used to enhance the functionality of smart cards is to embed the digital watermark in the data stored in the chip. For example, in some identification documents, smart card chips can be used to store sensitive information such as biometric data or biometric template (e.g., facial photo, fingerprint, iris or retinal scan, or template thereof). In this case, fragile watermarks that detect even slight changes to the data stored on the chip can be used to check for alteration of the data on the chip. One example of such a fragile watermark is disclosed in Ser. No. 10/319,404, cited above. (The Ser. No. 10/319,404 application also discusses so-called "reversible watermarking". A watermark is reversible if a data set can be watermarked, thereby changing the data somewhat, and at a later time the watermark can be removed, or substantially removed, in order to return to the original un-watermarked data set. A reversible watermark may be advantageously used when watermarking a biometric sample, e.g., an image of a fingerprint or retinal scan, so that watermark can be read and removed, yielding a unmarked biometric sample.) In addition to detecting alterations, the digital watermark embedded in the data on the chip can be used to perform other functions, such as carrying a unique link to other security elements or printed information on the document as described above, carrying an index to a database entry where more information is stored (such as biometric information, bearer information, etc.)

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants hereby incorporate by reference each of the patent documents referenced above.

The methods, processes, and systems described above may be implemented in hardware, software or a combination of hardware and software. For example, the digital watermark encoding processes and holographic structure generation processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

In one embodiment, instead of a smart card, a conventional credit card (with a magnetic strip) is used. The credit card preferably includes a hologram or other security feature, which is embedded with a digital watermark as discussed above. The watermark includes information bits to allow authentication or verification, as discussed above. Instead of a hologram, a credit card may have a graphic, personal photograph, picture, logo, text, and/or background, which includes a digital watermark.

The particular combinations of elements and features in the above-detailed embodiments are exemplary only; the interchanging and substitution of these teachings with other teachings in this and the incorporated-by-reference patents/applications are also expressly contemplated.

We claim:

1. A method involving a document that includes a smart card chip, the method comprising:
    computing a first hash of a digital watermark message using a hardware processor configured to perform such act;
    storing the first hash in the smart card chip;
    computing a hash of data stored in the smart card chip; and
    augmenting the digital watermark message with the hash of the data stored in the smart card chip, encoding the augmented digital watermark message into a digital watermark, and embedding the digital watermark in the document.

2. The method of claim 1 wherein hashes of multiple digital watermark messages are stored in the smart card chip.

3. The method of claim 1 wherein the first hash is randomized before being stored in the smart card chip.

4. The method of claim 1 that includes embedding the augmented digital watermark message in a optically variable device on the document.

5. A document including a substrate and two security elements, one of said security elements comprising a smart card chip conveyed by the substrate, another of said security elements comprising a digital watermark conveyed by the substrate, the digital watermark encoding a message, the smart card chip storing data that includes a hash of said message, the digital watermark also encoding a hash of data stored in the smart card chip, wherein said two security elements convey interdependent data so as to enhance security of the document and enable document authentication.

* * * * *

UNITED STATES PATENT AND TRADEMARK OFFICE
CERTIFICATE OF CORRECTION

PATENT NO. : 8,321,350 B2
APPLICATION NO. : 12/473488
DATED : November 27, 2012
INVENTOR(S) : Robert T. Durst, Jr.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this
Twenty-eighth Day of May, 2013

Teresa Stanek Rea
*Acting Director of the United States Patent and Trademark Office*